US009769494B2

(12) United States Patent
Mammou et al.

(10) Patent No.: US 9,769,494 B2
(45) Date of Patent: *Sep. 19, 2017

(54) ADAPTIVE SEARCH WINDOW POSITIONING FOR VIDEO ENCODING

(71) Applicant: ATI Technologies ULC, Markham (CA)

(72) Inventors: Khaled Mammou, Thornhill (CA); Ihab M. A. Amer, Stouffville (CA)

(73) Assignee: ATI Technologies ULC, Markham, ON (CA)

( * ) Notice: Subject to any disclaimer, the term of this patent is extended or adjusted under 35 U.S.C. 154(b) by 247 days.

This patent is subject to a terminal disclaimer.

(21) Appl. No.: 14/450,094

(22) Filed: Aug. 1, 2014

(65) Prior Publication Data

US 2016/0037166 A1  Feb. 4, 2016

(51) Int. Cl.
- *H04N 19/134* (2014.01)
- *H04N 19/57* (2014.01)
- *H04N 19/597* (2014.01)

(52) U.S. Cl.
CPC ........... *H04N 19/57* (2014.11); *H04N 19/597* (2014.11)

(58) Field of Classification Search
CPC ............................................. H04N 1/00–1/999
See application file for complete search history.

(56) References Cited

U.S. PATENT DOCUMENTS

| | | | | |
|---|---|---|---|---|
| 5,473,379 A | * | 12/1995 | Horne | H04N 19/56 348/699 |
| 7,038,676 B2 | * | 5/2006 | Iwata | H04N 19/51 345/418 |
| 8,494,052 B2 | * | 7/2013 | Chang | H04N 19/192 375/240.16 |
| 2001/0002922 A1 | * | 6/2001 | Hayashi | H04N 5/145 375/240.16 |
| 2004/0104935 A1 | * | 6/2004 | Williamson | G06F 3/012 715/757 |
| 2004/0233461 A1 | | 11/2004 | Armstrong et al. | |
| 2009/0097751 A1 | * | 4/2009 | McDowell | G06T 7/2053 382/181 |

(Continued)

FOREIGN PATENT DOCUMENTS

| | | |
|---|---|---|
| EP | 1 176 559 A2 | 1/2002 |
| EP | 1 610 561 A2 | 12/2005 |
| EP | 1 936 996 A2 | 6/2008 |

OTHER PUBLICATIONS

International Search Report for International Application No. PCT/CA2015/050719 mailed Nov. 3, 2015.

*Primary Examiner* — Sean Motsinger

(74) *Attorney, Agent, or Firm* — Volpe and Koenig, P.C.

(57) ABSTRACT

A method, system, and computer program product that exploits motion hints associated with rendered video frames. These motion hints are provided to a video encoder to guide a motion-compensation prediction process performed by the video encoder. Specifically, these motion hints can be used to better position a search window in a reference video frame to better capture the motion of a block of pixels in the reference video frame. Because the search window is better positioned in the reference video frame, the memory required to perform the encoding process can be reduced without sacrificing the level of encoded image quality.

7 Claims, 10 Drawing Sheets

(56) References Cited

U.S. PATENT DOCUMENTS

| | | | | |
|---|---|---|---|---|
| 2013/0072299 A1* | 3/2013 | Lee | H04N 19/51 |
| | | | 463/32 |
| 2014/0177716 A1* | 6/2014 | Chen | H04N 19/56 |
| | | | 375/240.16 |
| 2014/0321757 A1* | 10/2014 | Azar | G06T 9/001 |
| | | | 382/215 |
| 2015/0092856 A1* | 4/2015 | Mammou | H04N 19/597 |
| | | | 375/240.16 |
| 2015/0117524 A1* | 4/2015 | Rondao Alface | H04N 19/187 |
| | | | 375/240.08 |
| 2016/0037166 A1* | 2/2016 | Mammou | H04N 19/139 |
| | | | 382/236 |

* cited by examiner

US 9,769,494 B2

ADAPTIVE SEARCH WINDOW POSITIONING FOR VIDEO ENCODING

FIELD

This application relates generally to video encoding and, more specifically, to motion-compensation prediction.

BACKGROUND

Video encoders often apply motion-compensated prediction in order to reduce the amount of data to encode by exploiting temporal correlation between successive video frames. Motion-compensated prediction is the process of describing a current video frame in terms of a transformation of a reference video frame. Motion-compensated prediction is based on the fact that often the only difference between one video frame and another is the result of the camera moving or an object in the frame moving. This means that much of the information that represents one frame will be the same as the information used in the next frame.

Motion-compensated prediction consists of finding, for each block in the current frame, the "best possible" match within a reference frame. However, searching the entire reference frame is prohibitively expensive in terms of computational complexity and memory bandwidth. Accordingly, practical implementations of software and hardware video encoders search a selected area, i.e. a search range, that lies within the reference frame around a predicted motion vector that is computed based on previously encoded blocks.

Moreover, in many cases, the encoder does not contain enough memory to store the entire reference frame. Accordingly, in practice, a video encoder typically stores only a subset of the reference frame, i.e., a search window. This search window is typically centered on the correspondingly positioned block in the reference frame, i.e. the collocated block. The predicted motion vector is then restricted to stay inside this search window. The searched area is the overlapping region between the search window and the search range.

The larger the search window, the more expensive the video encoding process becomes in terms computational complexity and memory bandwidth. Specifically, the larger the search window, the larger the required memory footprint, and the higher the cost of a hardware implementation of a video encoder.

On the other hand, for fast motion frames, a smaller search window may lead to the failure of the motion-compensation prediction procedure to efficiently capture the motion since the object would very likely move outside the search window. In practice, this would result in encoding the current block as an intra-predicted block or an inter-predicted block with high-energy residuals. In both cases, the Rate-Distortion (R-D) performance of the encoder will be severally affected. As a result, a higher bit-rate would be required to encode the video frames.

SUMMARY OF EMBODIMENT(S)

What is therefore needed are systems and methods that can efficiently encode fast motion video using video encoders with limited memory.

Embodiments, under certain circumstances, include a method for generating a motion hint based on motion information received by an application that produces reference and current video frames, and providing the motion hint to a video encoder to guide a motion-compensation prediction process performed by the video encoder to encode a current video frame. This motion hint can be used to better position a search window in a reference video frame to better capture the motion of a block of pixels in the reference video frame. Because the search window is better positioned in the reference video frame, the memory required to perform the encoding process can be reduced without sacrificing the level of encoded image quality.

Further features and advantages of the embodiments, as well as the structure and operation of the embodiments, are described in detail below with reference to the accompanying drawings. It is noted that the embodiments are not limited to the specific embodiments described herein. Such embodiments are presented herein for illustrative purposes only. Additional embodiments will be apparent to a person of ordinary skill in the relevant art based on the teachings contained herein.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
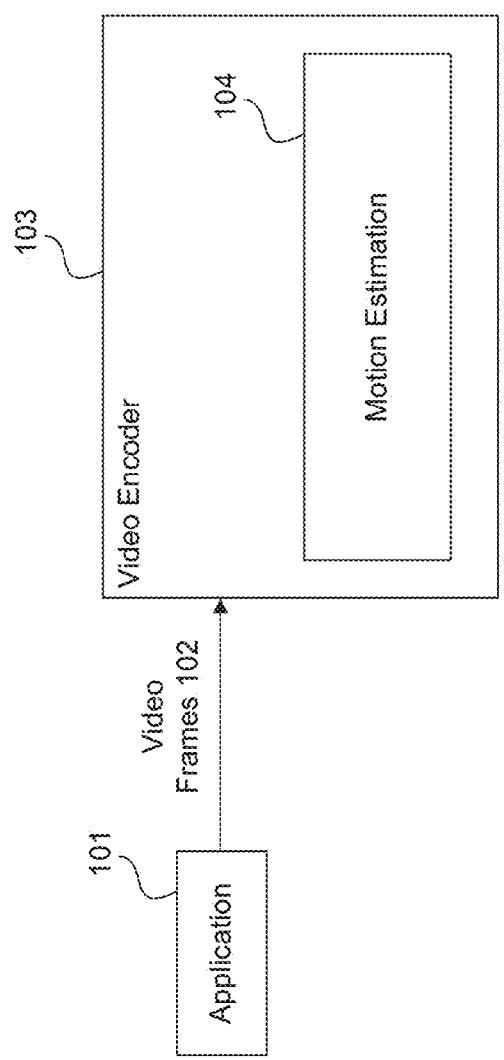
FIG. 1 illustrates a functional block diagram of a system in which embodiments of the present disclosure can be implemented

The embodiments of the present disclosure will be described with reference to the accompanying drawings.

The drawing in which an element first appears is typically indicated by the leftmost digit(s) in the corresponding reference number.

DETAILED DESCRIPTION OF EMBODIMENT(S)

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

The present disclosure is directed to embodiments related to a system and method for exploiting motion hints based on information received by an application that produces rendered video frames in order to more efficiently encode the rendered video frames. Before describing further details of the system and method, a brief overview of video encoding is provided.

In general, video encoding is the process to decrease the amount of bits required to encode a sequence of rendered video frames by eliminating redundant image information. For example, closely adjacent video frames in a sequence of video frames are usually very similar and often only differ in that one or more objects in the scenes they depict move slightly between the sequential frames. Video encoding is configured to exploit this temporal redundancy between video frames in at least one instance by searching a reference video frame for a block of pixels that closely matches a block of pixels in a current video frame to be encoded.

A video encoder exploits the fact that there is generally no need to store or transmit the block of pixels in the current video frame that is redundant with the closely-matched block of pixels in the reference video frame. The video encoder instead forms a prediction of the block of pixels in the current video frame based on the closely-matched block of pixels in the reference video frame to determine the redundant information and then subtracts the prediction from the block of pixels in the current video frame, leaving only a residual. This process is often referred to as motion-compensation prediction. The residual (or information determined based on the residual) can then be sent to the receiving device without the redundant information to decrease the amount of bits needed to transmit the current video frame.

A video decoder can reconstruct the block of pixels in the current video frame based on the residual. The redundant information can be predicted based on the closely-matched block of pixels in the reference video frame using, for example, the same prediction method performed by the video encoder.

In one embodiment, the system and method of the present disclosure exploits global motion hints associated with a sequence of rendered video frames to improve the motion-compensation prediction process performed by a video encoder to encode the sequence of rendered video frames. Motion-compensation prediction, as described above, includes searching for a block of pixels in a reference video frame that closely matches a block of pixels in a current video frame to be encoded. Improving this searching process can reduce the amount of time and/or bits used to encode the block of pixels in the current video frame.

In another embodiment, the system and method of the present disclosure exploit semi-global motion hints associated with a sequence of rendered video frames to improve the motion-compensation prediction process performed by a video encoder to encode the sequence of rendered video frames.

The embodiments of the system and method of the present disclosure described above can be used in applications where motion hints are available as would be appreciated by one of ordinary skill in the art based on the teachings herein. For example, the method and system of the present disclosure can be used in a video game that receives user inputted commands associated with motion information in order to generate a motion hint.

These and other features of the present disclosure, as well as the structure and operation of various embodiments, are described in further detail below with reference to the accompanying drawings.

2. Example Operating Environment

FIG. 1 illustrates a functional block diagram 100 of an example operating environment in which embodiments of the present disclosure can be implemented. Block diagram 100 includes an application 101, rendered video frames 102, a video encoder 103, and a motion estimation 104.

Application 101 may be an end-user application, such as a video game, a video editing application, a computer-aided design (CAD) application, a computer-aided manufacturing application, or the like, that produces video frames for rendering and display.

Once rendered, the sequence of rendered video frames 102 can be provided to video encoder 103 for encoding to decrease the amount of bits required to store or transmit the sequence of rendered video frames 102 to a receiving device over a network. For example, video encoder 103 decreases the amount of bits required to store or transmit the sequence of rendered video frames 102 by eliminating redundant image information. In one example, closely adjacent video frames in the sequence of rendered video frames 102 are usually very similar and often only differ in that one or more objects in the scenes they depict move slightly between them.

Motion estimation 104 may be configured to exploit this temporal redundancy between video frames in at least one example by searching a reference video frame in the sequence of rendered video frames 102 for a block of pixels that closely matches a block of pixels in a current video frame to be encoded. The current video frame and the reference video frame can be consecutive video frames in sequence of rendered video frames 102 or can be spaced farther apart in time. Assuming the closely-matched block of pixels in the reference video frame was already transmitted to the receiving device, motion estimation 104 exploits the fact that there is generally no need to send to the receiving device the content of the block of pixels in the current video frame that is redundant with the closely-matched block of pixels in the reference video frame. Motion estimation 104 instead forms a prediction of the block of pixels based on the closely-matched block of pixels in the reference video frame to determine the redundant information and then subtracts the prediction from the block of pixels, leaving only a residual. This process is referred to as motion-compensation prediction. Residual (or information determined based on residual) can then be sent to the receiving device without the redundant information to decrease the amount of bits needed to transmit the current video frame.

Figure 2:
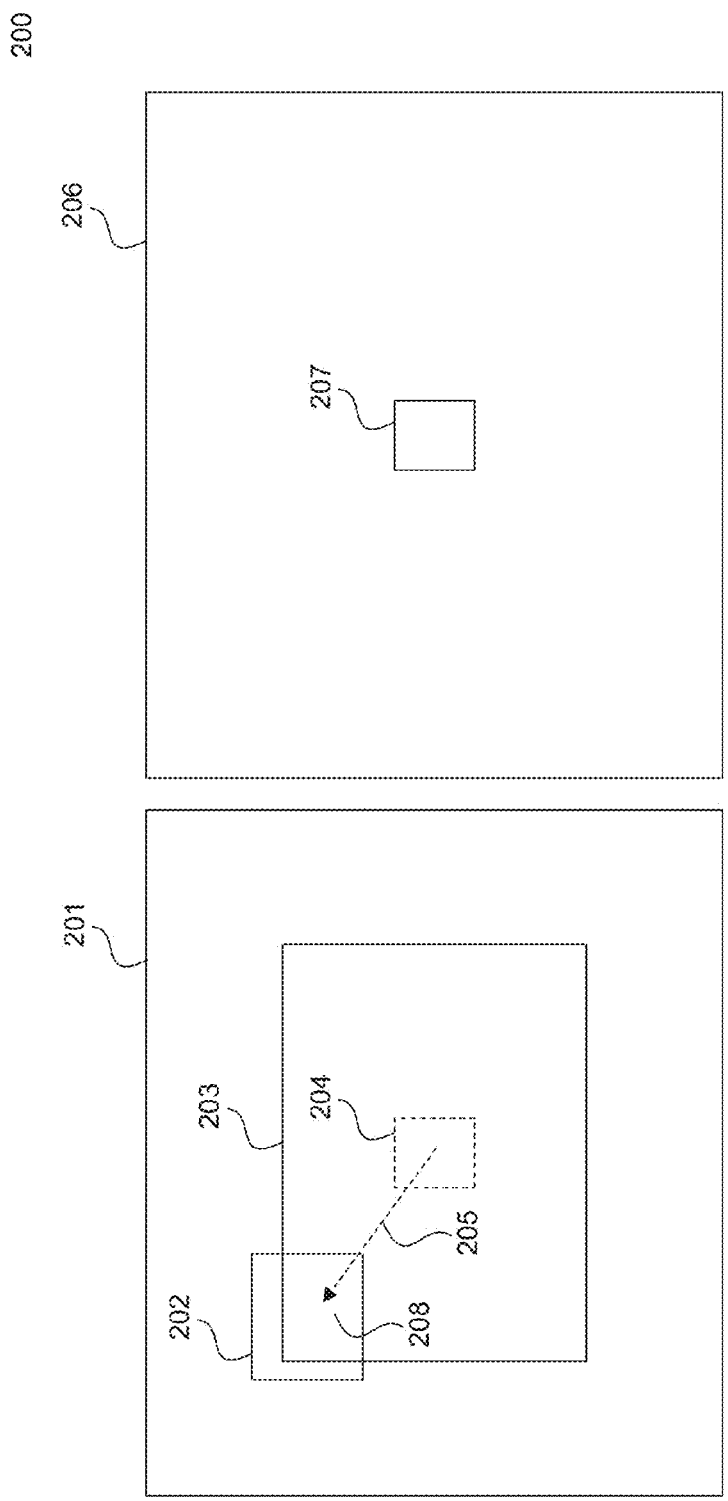
FIG. 2 illustrates a motion-compensation prediction process typically employed by video encoders to encode a current video frame using a reference video frame.

FIG. 2 illustrates further details of the traditional motion-compensation prediction process 200 employed by video encoder 106 to encode a block of pixels according to embodiments of the present disclosure. As described above, the motion-compensation prediction process can include searching for a block of pixels in reference video frame 201 that closely matches a block of pixels 207 in current video frame 206 to be encoded. Because searching the entire reference video frame 201 can be prohibitively expensive in terms of memory and computational complexity, practical implementations of software and hardware video encoders can search a selected area of reference video frame 201, referred to as a search range 202. Search range 202 can lie within reference video frame 201 around a predicted motion vector 205 that is computed based on previously encoded blocks of pixels.

In many instances, especially in hardware encoder implementations, the video encoder may not be equipped with enough memory to store the entire reference video frame 201. Hence, a subset of reference video frame 201, referred to as a search window 203, can be stored, and predicted motion vector 205 can be restricted to stay inside search window 203. Search window 203 can be typically centered on a block of pixels 204 in reference video frame 203 that is located at the same relative position as block of pixels 207 in current video frame 206. This block of pixels 204 may be often referred to as a collocated block. As is shown in FIG. 2, part of search range 202 may be outside search window 203. In such an instance, the actual searched area 208 is the overlapping region between search window 203 and search range 202.

In general, the smaller search window 203 is made, the smaller the required memory footprint and the lower the cost of implementing video encoder 103 shown in FIG. 1. But for video frames depicting relatively fast-motion scenes or when a frame with a large temporal distance from the frame to be encoded is used as a reference frame, restricting the size of search window 203 too much may lead to the failure of the motion-compensation prediction process to efficiently capture the motion between video frames. Failure occurs because objects depicted by block of pixels 207 will likely have moved outside search window 203. In practice, this can result in encoding block of pixels 207 as an intra-predicted block or an inter-predicted block with high-energy residuals. In either case, the number of bits used to encode block of pixels 207 will typically need to be increased in order to maintain the same level of encoded image quality had search window 203 been large enough to better capture the motion between video frames. As will be described in the following section, embodiments of the system and method of the present disclosure can help to alleviate this tradeoff between the size of search window 203 and the number bits required to encode block of pixels 207 by exploiting motion hints associated with reference video frame 201 and current video frame 206.

Figure 3:
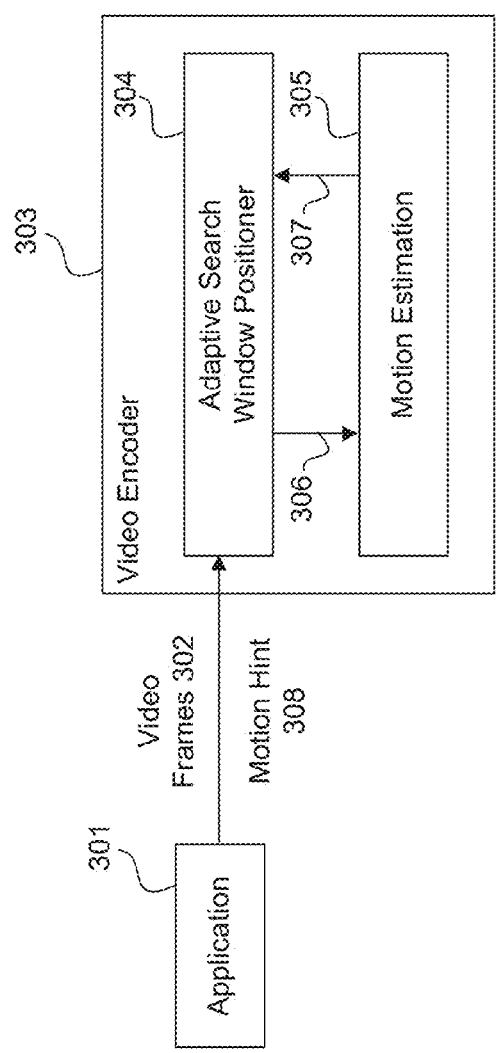
FIG. 3 illustrates a functional block diagram of a system for exploiting a motion hint associated with rendered video frames to more efficiently encode the rendered video frames in accordance with embodiments of the present disclosure.

3. System and Method for Adaptively Positioning a Search Window for Video Encoding FIG. 3 illustrates a functional block diagram 300 that is substantially similar to functional block diagram 100 in FIG. 1, with the exception that adaptive search window positioner 304 has been added and some modifications to existing blocks have been made according to embodiments of the present disclosure. In particular, application 301 has been modified, in at least one embodiment, to provide motion hint 308 associated with sequence of rendered video frames 302 as output.

Adaptive search window positioner 304 may be an intermediary between application 301 and motion estimation 305 on which the scenes produced by application 301 are encoded using motion compensation prediction. Adaptive search window positioner 304 can make motion estimation more effective by intelligently searching for matching blocks of pixels using motion hint 308. In an embodiment, adaptive search window positioner 304 is contained within video encoder 303.

In one example, adaptive search window positioner 304 is configured to process motion hint 308 to guide the motion-compensation prediction process performed by motion estimation 305. In one embodiment, motion estimation 305 is contained within video encoder 303. In one embodiment, motion hint 308 may include a single motion vector. As would be appreciated by a person of ordinary skill in the art, motion hint 308 may also be used to generate a single motion vector. This motion vector may be associated with the entire current video frame 206 and predicts the motion of all the blocks associated with reference video frame 201. In other words, this single motion vector constitutes a global motion hint.

In another embodiment, motion hint 308 may include a number of different motion vectors. Alternatively, in another embodiment, motion hint 308 may be used to generate a number of different motion vectors. Each motion vector is associated with a different image region in current video frame 206, and each motion vector is used to predict the motion of the blocks associated with the corresponding region in reference video frame 201. In other words, in these two embodiments, motion hint 308 provides semi-global motion hints.

Whether motion hint 308 is associated with single motion vector or a number of motion vectors, motion hint 308 may be used by video encoder 303 to more efficiently encode a block of pixels 207 in current video frame 206. Specifically, motion hint 308 provided by application 301 can be used to find a motion vector associated with an image region of current video frame 206 in which the block of pixels 207 lies. This motion vector can then be used to better position search window 203 in reference video frame 201 to better capture the motion of block of pixels 207 from reference video frame 201. Because search window 206 is better positioned to capture the motion of block of pixels 207 from reference video frame 201, it can be made smaller without increasing the number of bits needed to encode the block of pixels 207, while also still maintaining the level of encoded image quality.

As a consequence of the foregoing, certain benefits may be obtained or manifested in various circumstances. For example, as a consequence of the motion hints described above, a cloud or other remote server employing aspects of embodiments described herein may encode frames more quickly and/or with reduced processing and/or power requirements. Additionally, frames so rendered may appear to a user of an end-user device to be have a perceived higher quality or, alternatively, equal quality of prior art techniques but with reduced latency. Accordingly, a system encompassing such a cloud or other remote server and one more end-user devices may operate with greater efficiency.

Figure 4:
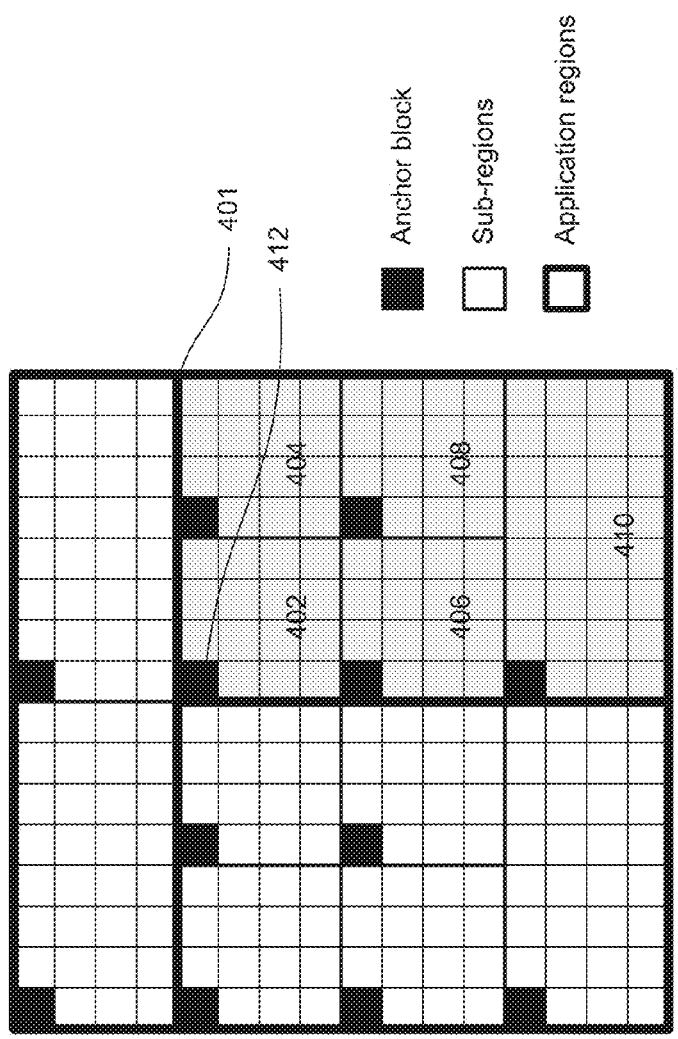
FIG. 4 illustrates partitioning a rendered video frame into regions and sub-regions in order to more efficiently encode the rendered video frame using a motion hint in accordance with embodiments of the present disclosure.

Referring now to FIG. 4, further details of the operation of adaptive search window positioner 304 is illustrated in accordance with embodiments of the present disclosure. Specifically, FIG. 4 details using one or more motion vectors associated with motion hint 308 in order to assist encoding one or more different image regions in current video frame 206 from reference video frame 201.

In one example, application 301 generates one or more application regions in current video frame 206. The size and position of each application region can be determined by application 301. For example, in FIG. 4, current video frame 206 is composed of three application regions. Application region 401, for example, is located in the bottom right of current video frame 206. As would be appreciated by a person of ordinary skill in the art, various strategies can be used to choose the sizes and positions of the application regions.

Adaptive search window positioner 304 can associate a different motion vector with each application region. Each motion vector may be based on motion hint 308 generated by application 301. In an embodiment, each motion vector is directly included in motion hint 308. In another embodiment, each motion vector is generated from motion hint 308. As would be appreciated by a person of ordinary skill in the art, the motion vector may be generated either by application 301 or adaptive search window positioner 304. Moreover, as would be appreciated by a person of ordinary skill in the art, motion hint 308 may be based on user input and non-user input types of motion information. For example, motion hint 308 may be based on commands inputted by a user when playing a video game application.

Next, the one or more application regions may be partitioned into one or more sub-regions by adaptive search window positioner 304. For example, application region 401 is partitioned into sub-regions 402, 404, 406, 408, and 410. The size and position of each sub-region may be determined by adaptive search window positioner 304.

The granularity of the sub-regions can control the balance between the accuracy of the motion estimation and the memory traffic requirements and computational complexity. As would be appreciated by a person of ordinary skill in the art, various strategies may be utilized to achieve this balance. For example, one strategy consists of splitting the current video frame into a set of equally sized sub-regions. Another, potentially more optimal strategy, consists of choosing the sub-region sizes and positions based on the motion vector distribution across previous video frames, the temporal difference between the current video frame and the reference video frame, and scene change hints provided by the application.

The blocks of pixels in each sub-region can be encoded based on the motion vector associated with the corresponding application region. For example, sub-regions 402, 404, 406, 408, and 410 are encoded based on the motion vector associated with application region 401.

In one example, after partitioning the one or more application regions into one or more sub-regions, an anchor block is defined for each sub-region. In one embodiment, an anchor block is defined as the first block of a sub-region of the current video frame 206. For example, in FIG. 4, anchor block 412 is the first block of sub-region 402 within application region 401.

Figure 5:
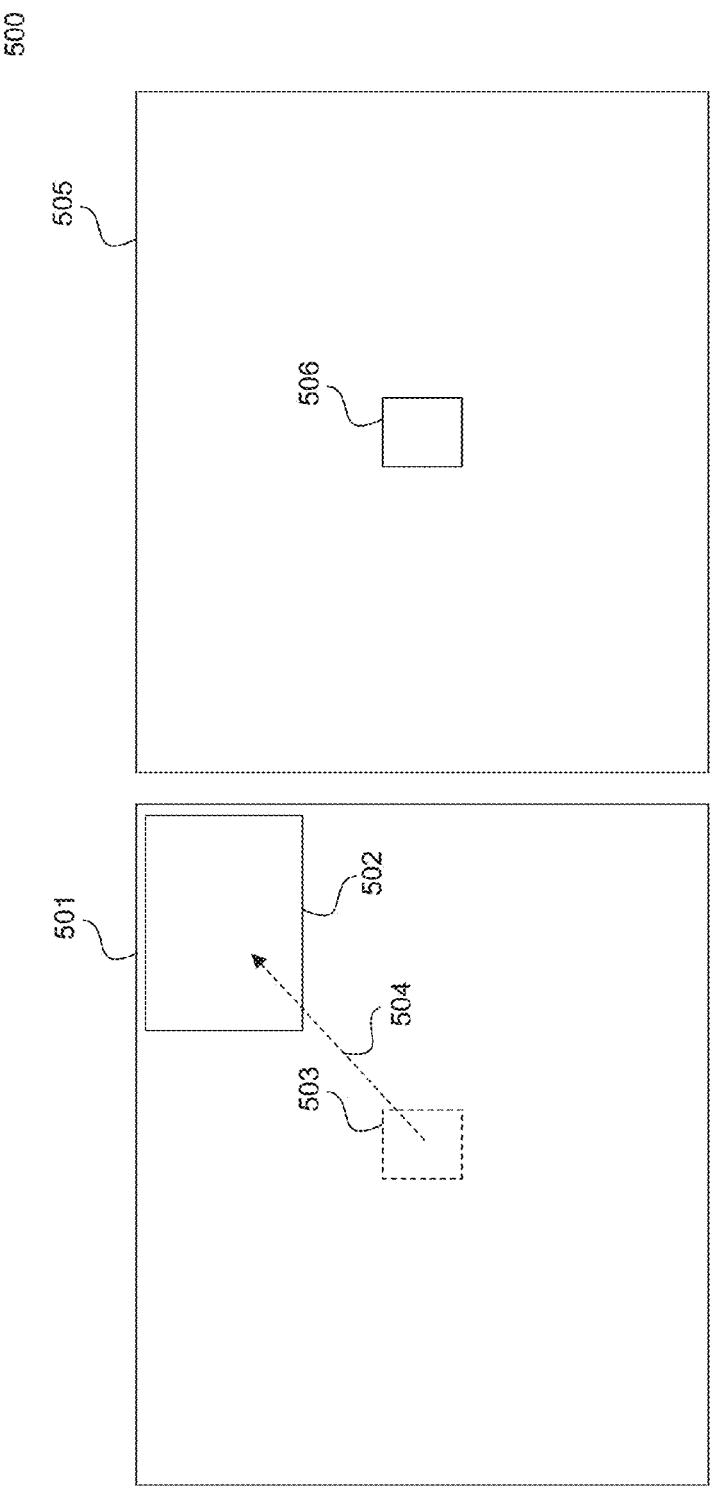
FIG. 5 illustrates identifying a search window position in order to more efficiently encode a rendered video frame using a motion hint in accordance with embodiments of the present disclosure.

Referring now to FIG. 5, further details of the operation of adaptive search window positioner 304 is illustrated in accordance with embodiments of the present disclosure. Specifically, after defining the anchor blocks, adaptive search window positioner 304 decides where to position the search window to encode the blocks in the current video frame. A determination of where to place the search window is done for each sub-region.

In one example, in order to encode the blocks of pixels in a sub-region, the search window may be first centered on the collocated block position of the associated anchor block translated by the associated motion vector. For example, in FIG. 5, block of pixels 506 in current video frame 505 correspond to anchor block 412 in sub-region 402. And block of pixels 506 corresponds to collocated block 503 in reference video frame 501. Thus, the position of the search window 502 is at the position of collocated block 503 translated by motion vector 504.

Alternatively, if no motion hint was provided by the application, then the search window is centered on the collocated block position of the anchor block in the reference video frame without translation. For example, in FIG. 5, search window 502 would be centered on collocated block 503 in reference video frame 501.

In the case of a provided motion hint, the anchor block is first encoded with search window 502 centered on the collocated block position of the anchor block translated by the associated motion vector. If the R-D cost reported by motion estimation 305 of encoding the anchor block with this search window position is higher than a threshold, then adaptive search window positioner 304 evaluates the Rate-Distortion (R-D) cost of positioning the search window at other positions. As would be appreciated by a person of ordinary skill in the art, the threshold may set to a value to balance the number bits required to encode blocks of pixels against the computational complexity of doing so. Moreover, in an embodiment, the threshold may be changed adaptively depending on encoding strategy.

Figure 6:
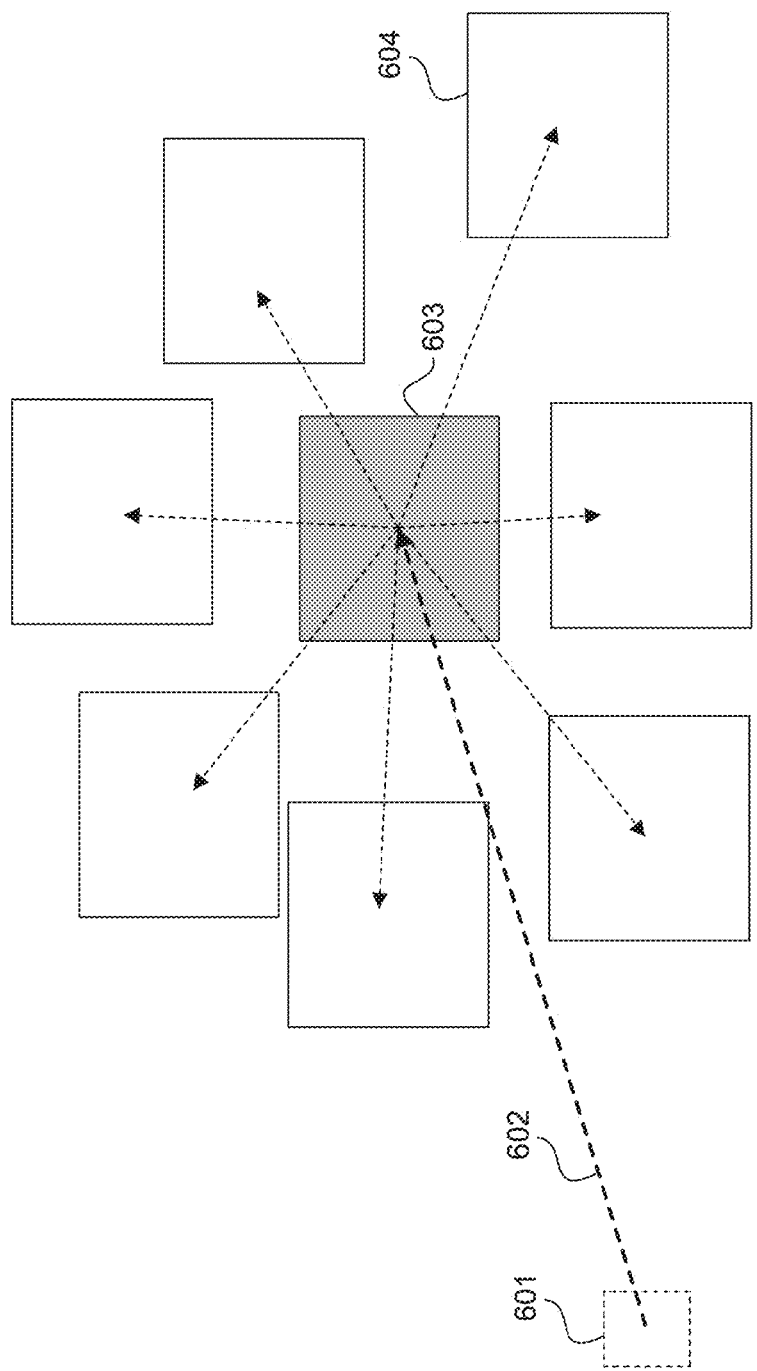
FIG. 6 illustrates identifying extra search window positions in order to more efficiently encode a rendered video frame using a motion hint in accordance with embodiments of the present disclosure.

FIG. 6 illustrates the process of evaluating the R-D cost of positioning the search window at these other positions according to embodiments of the present disclosure. In one example, search window 603 is initially positioned at block of pixels 601 translated by motion vector 602. This initial position corresponds to the position of search window 502 in FIG. 5. Subsequently, extra search window positions are identified. For example, in FIG. 6, seven extra search window positions 604 are identified. As would be appreciated by a person of ordinary skill in the art, the number of extra search window positions 604 may be based on a balance between computational complexity and video encoding efficiency.

Various strategies may be used to choose the extra search window positions 604. These strategies may be based on the previously encoded video frames or previously encoded blocks within the same video frame. As would be appreciated by person of ordinary skill in the art, one strategy would be to choose N uniformly sampled positions around the initial search window position 603, i.e. the search window positioned at the collocated block translated by the associated motion vector.

After identifying the number and locations of the extra search window positions 604, adaptive search window positioner 304 evaluates the R-D cost of positioning the search window at each of the extra search window positions 604. If the lowest R-D cost among the extra search window positions 604 is still higher than or equal to the threshold set above, then the position of the search window remains at search window position 603. In other words, the search window is still centered on the collocated block position of the anchor block translated by the associated motion vector, e.g. search window 603, in FIG. 6. On other hand, if the lowest R-D cost among the extra search windows positions 604 is lower than the threshold, then the search window is positioned at the extra search window position 604 with the lowest R-D cost.

Once the final search window position is selected, the non-anchor blocks in the current sub-region are encoded using the final search window position. However, the final search window position is shifted over based on the difference in position between a non-anchor block and the anchor block. Subsequently, after encoding the blocks in one sub-region, the other sub-regions in the corresponding application region are encoded. These other sub-regions inherit the same final search window position. However, the final search window position is similarly shifted over based on the difference in position between a non-anchor block and the anchor block for that region.

Figure 7:
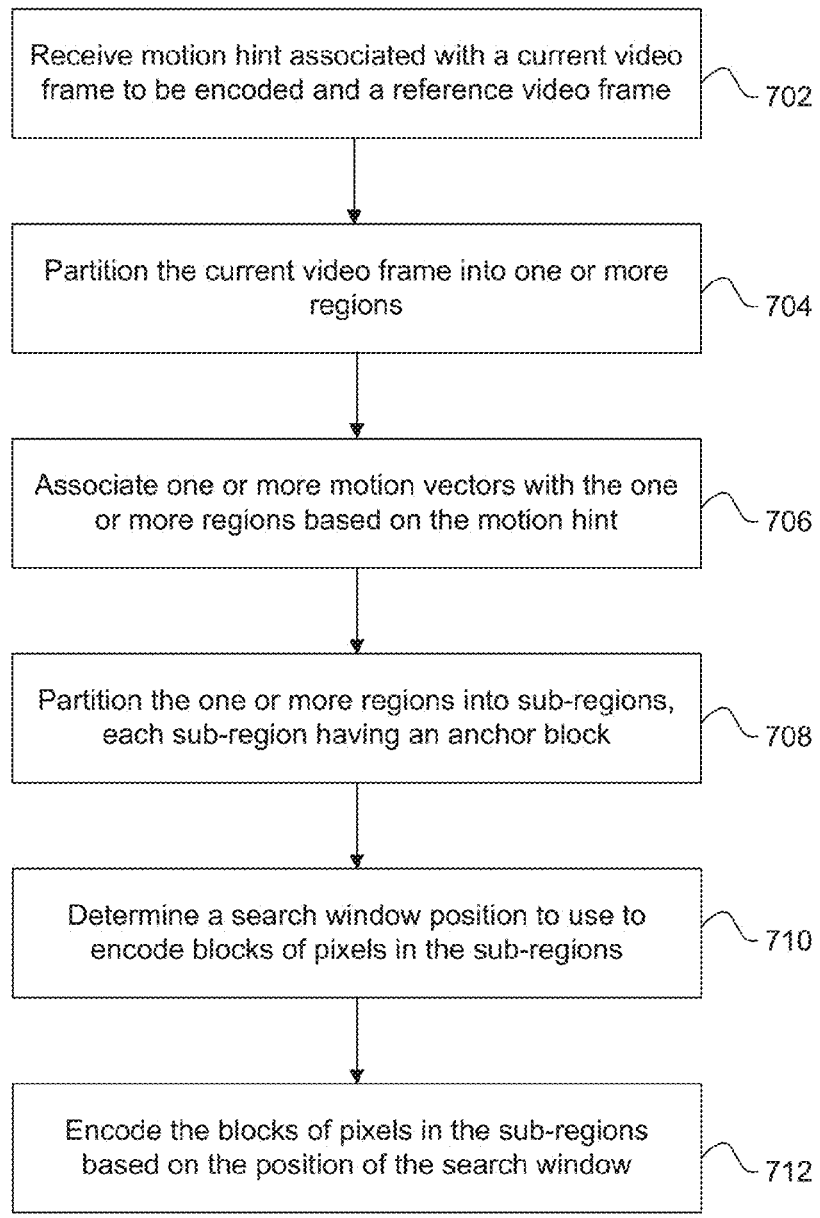
FIG. 7 illustrates a flowchart of a method for using a motion hint to guide a motion-compensation prediction process performed by a video encoder in accordance with embodiments of the present disclosure.

Referring now to FIG. 7, a flowchart depicts a method 700 for adaptively positioning a search window for video encoding based on a motion hint is illustrated in accordance with embodiments of the present disclosure. In one example, the method 700 can be implemented by adaptive search window positioner 304 as described above in reference to FIGS. 3-6. However, it should be noted that the method can be implemented by other systems and components as well. It should be further noted that some of the steps of flowchart 700 do not have to occur, and/or do not have to occur in the order shown in FIG. 7.

At step 702, a motion hint 308 associated with a current video frame to be encoded and a reference video frame is received from application 301. As would be appreciated by a person of ordinary skill in the art, the received motion hint 308 may be based on user input and non-user input types of motion information.

At step 704, the current video frame is partitioned into one or more application regions. In one embodiment, the entire current video frame constitutes an application region. In another embodiment, the current video frame is partitioned into a plurality of application regions. As would be appreciated by a person of ordinary skill in the art, various strategies can be used to choose the sizes and positions of these application regions. In one embodiment, application 301 defines the partitioning strategy of the video frames.

In addition, the one or more application regions are partitioned into one or more sub-regions. In one embodiment, this partitioning is performed by adaptive search window positioner 304. The granularity of the sub-regions controls the balance between the accuracy of the motion estimation and the memory traffic requirements and computational complexity. In one embodiment, with a single application region, only a single sub-region is generated. In another embodiment, an application region is split into a set of equally sized sub-regions. In another embodiment, an application region is split into sub-regions based on the motion vector distribution across previous video frames, the temporal difference between the current video frame and the reference video frame, and scene change hints provided by application 301.

At step 706, the received motion hint 308 of step 702 is used to associate one or more motion vectors with the one or more application regions. In one embodiment, each motion vector is included in the received motion hint 308. In another embodiment, each motion vector is generated from the motion hint 308. As would be appreciated by a person of ordinary skill in the art, the motion vector may be generated by application 301 or adaptive search window positioner 304. In one embodiment, each motion vector in the one or more motion vectors is associated with an application region in the one or more application regions. As would be appreciated by a person of ordinary skill in the art, associating a motion vector with an application region may performed either by application 301 or adaptive search window positioner 304.

At step 708, the one or more application regions are partitioned into sub-regions. In an embodiment, the size and position of each sub-region is determined by adaptive search window positioner 304. The granularity of the one or more sub-regions controls the balance between the accuracy of the motion estimation and the memory traffic requirements and computational complexity. As would be appreciated by a person of ordinary skill in the art, various strategies may be utilized to achieve this balance.

After partitioning the one or more application regions into sub-regions, an anchor block is defined for each sub-region. In one embodiment, an anchor block is defined as the first block of a sub-region.

At step 710, a search window position is determined for each sub-region. The position of the search window is based on the motion vector associated with the corresponding application region. The search window is initially centered on the collocated block position of the associated anchor block translated by the associated motion vector. The anchor block is then encoded with the search window at this position. If the R-D cost of encoding the anchor block at this search window position is higher than a threshold, then extra search window positions are attempted. Various strategies may be used to choose the extra search window positions After identifying the extra search window positions, the R-D cost of positioning the search window at each of the extra search window positions is calculated. If the lowest R-D cost among the extra search window positions is still higher than or equal to the threshold set above, then the position of the search window remains at the initial search window position. On other hand, if the lowest R-D cost among the extra search windows positions is lower than the threshold, then the search window is positioned at the extra search window position with the lowest R-D cost.

At step 712, the anchor block is encoded using the final search window position. In addition, all the non-anchor blocks in the sub-region are encoded using the final search window position. However, for the non-anchor blocks the final search window position is shifted over based on the difference in position between each non-anchor block and the anchor block.

After encoding one sub-region, the other sub-regions in the corresponding application region are encoded. Each other sub-region inherits the same final search window position. However, the search window position is adjusted for each sub-region's corresponding anchor block. Moreover, for the non-anchor blocks the search window position is similarly shifted over based on the difference in position between each non-anchor block and the anchor block.

In an embodiment, using example system of FIG. 3 for illustration, motion hint 308 may be generated based on motion information received by application 301 that produces reference and current video frames. Application 301 may then provide the motion hint 308 associated with sequence of rendered video frames to video encoder 303.

Rendering may include a process of obtaining a video frame by projecting a three-dimensional scene onto a two-dimensional plane that corresponds to a view observed by a virtual camera. Depth information relating to the distance of objects in the three-dimensional scene from the virtual camera may be calculated during the rendering process to determine which objects in the three-dimensional scene should and should not be visible in the rendered video frame to a user. For example, certain objects in the three-dimensional scene should not be visible to the user because they lie behind other objects in the three-dimensional scene that are opaque.

Figure 8:
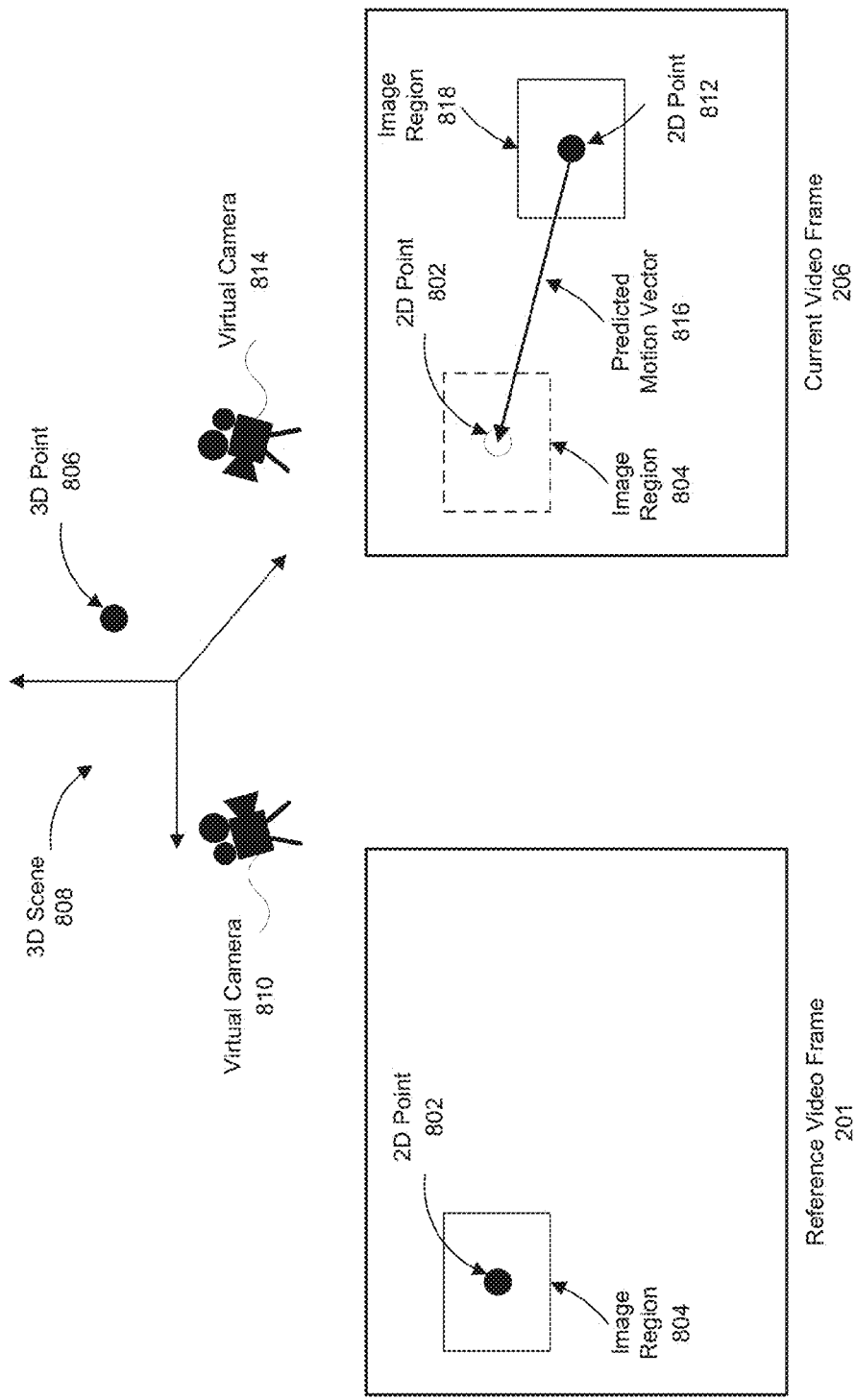
FIG. 8 illustrates a functional block diagram of a system for generating a motion vector for guiding a motion-compensation prediction process performed by a video encoder in accordance with embodiments of the present disclosure.

Referring to FIG. 8, further details of the operation of camera and depth information analyzed by application 301 in generating a motion hint is illustrated in accordance with embodiments of the present disclosure.

In an exemplary operation, application 301 selects an image region 804 in reference video frame 201. Application 301 then may associate a depth value and a two-dimensional point 802 (i.e., a pixel) in image region 804. In one embodiment, two-dimensional point 802 is selected as the barycenter of image region 804 and the depth value is set as the average depth value of the two-dimensional points (i.e., pixels) in image region 804. In one embodiment, the depth values of the two-dimensional points in image region 804 correspond to the distance of the objects they depict in three-dimensional scene 808 from a virtual camera 810.

Application 301 can then map two-dimensional point 802 back to a three-dimensional point 806 in three-dimensional scene 808. As would be appreciated by one of ordinary skill in the art, the mapping of two-dimensional point 802 to three-dimensional point 806 can be a reverse rendering process and can be performed using the position of two-dimensional point 802 in reference video frame 201, its associated depth value, and the position and orientation of virtual camera 814 used to render reference video frame 201. The position and orientation of virtual camera 810 are available to application 301.

Application 301 can map three-dimensional point 806 to a two-dimensional point 812 (i.e., a pixel) in current video frame 206 by rendering three-dimensional point 806 based on the position and orientation of a virtual camera 814 used to render current video frame 206. The position and orientation of virtual camera 814 may be similarly provided to application 301.

Application 301 can determine a motion vector 816 based on a difference in position of two-dimensional point 802 and two-dimensional point 812.

Application 301 can use motion vector 816 (or some information determined based on motion vector 816) to determine motion hint 308. Application 301 provides motion hint 308 to video encoder 303. As described above, video encoder 303 can use motion hint 308 to position a search window in reference video frame 201 while performing motion compensation prediction to more efficiently encode a block of pixels in image region 818 of current video frame 206.

Figure 9:
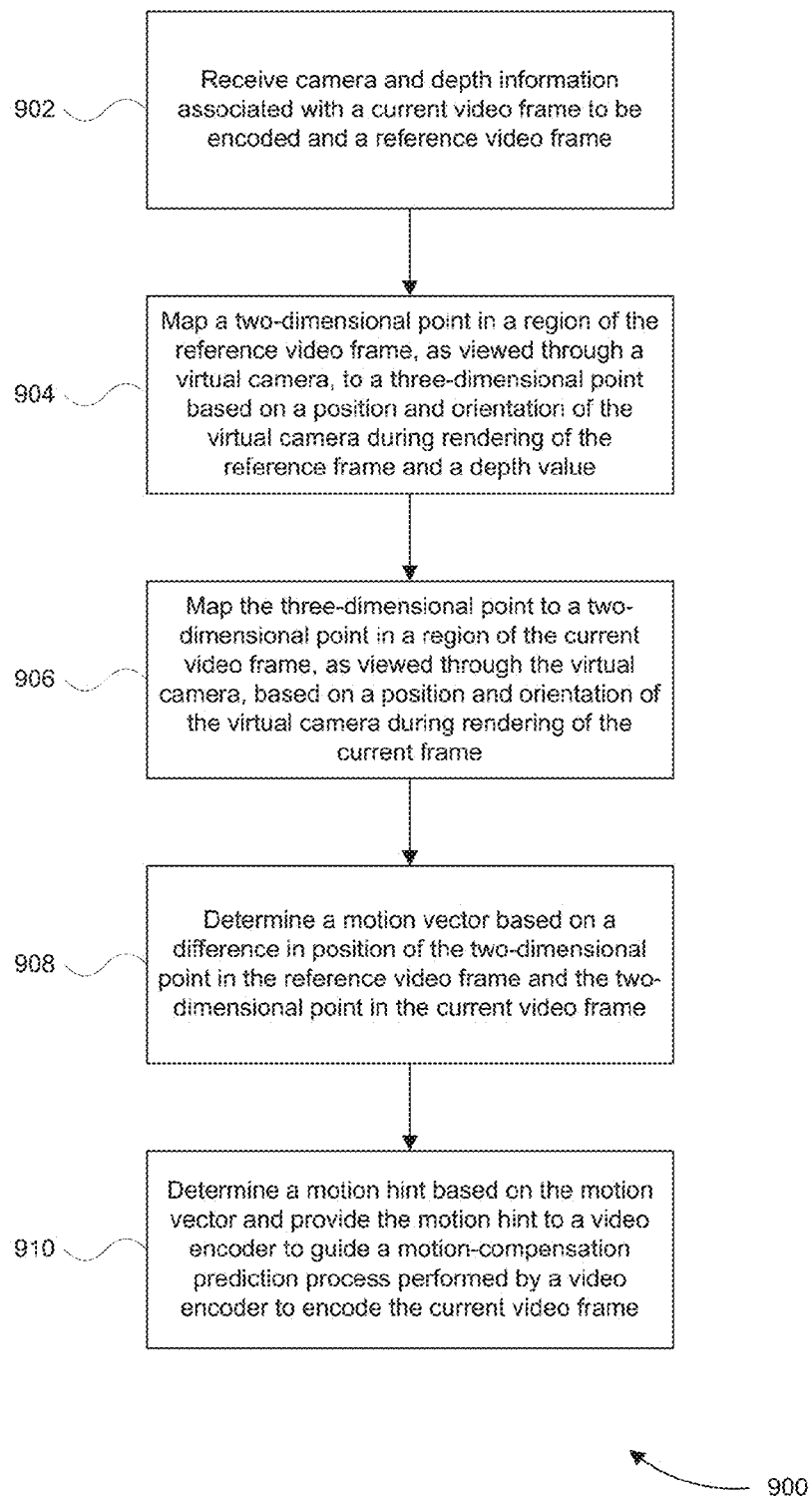
FIG. 9 illustrates a flowchart of a method for determining a motion hint to guide a motion-compensation prediction process performed by a video encoder in accordance with embodiments of the present disclosure.

Referring now to FIG. 9, a flowchart 900 of a method for generating a motion vector to guide a motion-compensation prediction process performed by a video encoder is illustrated in accordance with embodiments of the present disclosure. The method of flowchart 900 can be implemented by application 301 as described above. However, it should be noted that the method can be implemented by other systems and components as well. It should be further noted that some of the steps of flowchart 900 do not have to occur or in the order shown in FIG. 9.

At step 902, camera and depth information associated with a current video frame to be encoded and a reference video frame are received.

At step 904, a two-dimensional point (i.e., a pixel) in a region of the reference video frame, as viewed through a virtual camera, may be mapped to a three-dimensional point based on a depth value associated with the two-dimensional point and based on a position and orientation of the virtual camera during rendering of the reference frame. In one embodiment, the two-dimensional point may be selected as the barycenter of the reference video frame and the depth value is set as the average depth value of the two-dimensional points (i.e., pixels) in the image region of the reference video frame. In one embodiment, the depth values of the two-dimensional points in the image region of the reference video may correspond to the distance of the objects they depict from the virtual camera used to render them.

At step 906, the three-dimensional point may be mapped to a two-dimensional point in the current video frame, as viewed through the virtual camera, based on a position and orientation of the virtual camera during rendering of the current frame.

At step 908, a motion vector may be determined based on a difference in position of the two-dimensional point in the reference video frame and the two-dimensional point in the current video frame.

At step 910, the motion hint may be determined based on the motion vector. The motion hint may then be provided to a video encoder to guide a motion-compensation prediction process performed by the video encoder to encode the current video frame. For example, the video encoder can use motion hint to position a search window in the reference video frame while performing motion compensation prediction to more efficiently encode a block of pixels in the current video frame.

Another example in which the operations of FIGS. 8 and 9 can occur can be found in co-pending U.S. application Ser. No. 14/043,427, filed Oct. 1, 2013, which is incorporated by reference herein in its entirety.

It should be noted that the embodiments of the system and method of the present disclosure described above with reference to FIGS. 3-9 can be used in a server operating in a cloud gaming service to improve, for example, the amount of latency, downstream bandwidth, and/or computational processing power associated with playing a video game over its service. The method and system of the present disclosure can be further used in other applications where motion hint information associated with a rendered or captured video frame is available as would be appreciated by one of ordinary skill in the art based on the teachings herein. For example, the method and system of the present disclosure can be used in a video game application that receives user commands associated with motion information.

4. Example Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 10:
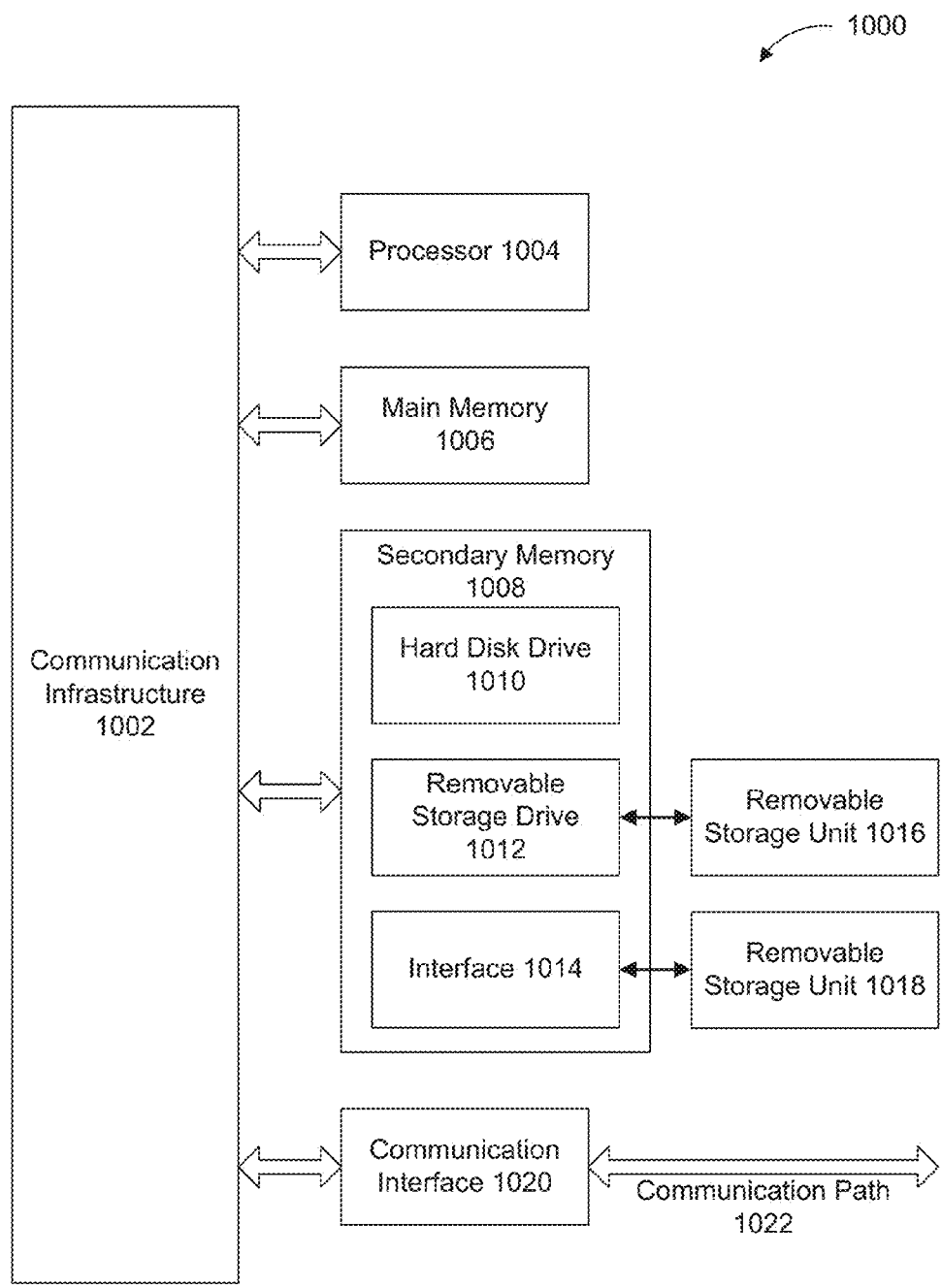
FIG. 10 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 1000 is shown in FIG. 10. All of the modules depicted in FIGS. 1 and 3 can execute on one or more distinct computer systems 1000. Furthermore, each of the steps of the flowchart depicted in FIG. 7 can be implemented on one or more distinct computer systems 1000.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosed embodiments using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a PCMCIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosed embodiments are implemented using software, the software may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

The Summary and Abstract sections may set forth one or more but not all exemplary embodiments as contemplated by the inventor(s), and thus, are not intended to limit the embodiments and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method comprising:
    receiving a motion hint that is generated based on motion information associated with a plurality of video frames, the plurality of video frames including a reference video frame and a current video frame, wherein the motion hint is associated with one or more motion vectors associated with one or more regions of the current video frame;
    partitioning a region of the current video frame into sub-regions, each sub-region having an anchor block;
    searching for matching blocks of pixels in the plurality of video frames using a search window in the reference video frame, wherein the motion hint and the anchor block in the sub-region are used to determine a position for the search window in the reference video frame to use to encode a block of pixels in a sub-region of the current video frame and the search window captures the motion of the matching blocks of pixels; and encoding the current video frame using the motion hint and the search window.

2. The method of claim 1, wherein the reference and current video frames are consecutive video frames in a sequence of video frames.

3. The method of claim 1, further comprising:
calculating a rate-distortion (R-D) cost for encoding the anchor block based on a position for the search window in the reference video frame, the anchor block being the first block of a sub-region of the current video frame;
comparing the R-D cost to a R-D threshold;
identifying extra search window positions in the reference video frame based on the comparison; and
updating the position of the search window to one of the extra search window positions based on the comparison.

4. The method of claim 1 further comprising partitioning the region of the current video frame into the sub-regions based on at least one of a motion vector distribution, a temporal difference between the reference video frame and current video frame, and a scene change hint.

5. A system comprising:
a processor;
memory; and
a video encoder configured to:
receive a motion hint that is generated based on motion information associated with a plurality of video frames, the plurality of video frames including a reference frame and a current video frame, wherein the motion hint is associated with one or more motion vectors associated with one or more regions of the current video frame;
partition a region of the current video frame into sub-regions, each sub-region having an anchor block;
search for matching blocks of pixels in the plurality of video frames using a search window in the reference video frame, wherein the motion hint and the anchor block in the sub-region are used to determine a position for the search window in the reference video frame to use to encode a block of pixels in a sub-region of the current video frame and the search window captures the motion of the matching blocks of pixels; and
encode the current video frame using the motion hint and the search window.

6. The system of claim 5, wherein the first and second video frames are consecutive video frames in a sequence of video frames.

7. The system of claim 5, wherein the video encoder is further configured to:
calculate a rate-distortion (R-D) cost for encoding an anchor block based on the position of the search window in the reference video frame, the anchor block being the first block of a sub-region in the region of the current video frame;
compare the R-D cost to a R-D threshold;
identify extra search window positions in the reference video frame based on the comparison; and
update the position of the search window to one of the extra search window positions based on the comparison.

* * * * *